3,419,445
COMPOSITE PROPELLENT COMPOSITIONS CONTAINING ROUNDED OXIDIZER PARTICLES OF A MAXIMUM SIZE OF 100 MICRONS
Michael Markels, Jr., Alexandria, Va., assignor to The Susquehanna Corporation, a corporation of Delaware
No Drawing. Filed July 20, 1960, Ser. No. 44,227
20 Claims. (Cl. 149—19)

This invention relates to new and improved propellent compositions. More specifically it relates to composite propellant compositions comprising a solid, inorganic oxidizer salt dispersed in a continuous matrix of an organic fuel carrier or binder.

Composite solid propellants comprising a solid, inorganic oxidizing salt, such as ammonium perchlorate or ammonium nitrate, dispersed in an organic fuel matrix containing molecularly combined carbon and hydrogen, are well known in the propellant art. Some high performance composite propellants also contain as an added fuel component a finely-divided solid, such as a finely-divided metal, which must also be incorporated into the organic matrix in the desired amounts along with the high concentration of solid oxidizer requisite for adequate combustion of both the organic and metal fuels. Composite semi-solid propellants, which are burned in the combustion chamber of the rocket or other gas-generating device in the form of continuously extruding, shape-retentive columns, have recently been introduced into the propellent art. Such plastic monopropellants comprise highly viscous slurries of finely divided solid inorganic oxidizer, with or without an added powdered metal fuel, suspended in a continuous organic liquid fuel matrix.

For the maximum performance required, for example, in many rocket applications, it is desirable to load the propellent mix with oxidizer in sufficient amount to meet or closely approach stoichiometric demand. The solid oxidizer loading necessary to fulfill such requirements poses serious problems both in terms of processing and in physical properties of the finished propellent composition. This is further complicated by the addition of an insoluble solid fuel, such as a powdered metal.

The composite propellants aforedescribed are made by admixing the solid components with the organic fuel matrix in liquid form. Liquidity of the organic matrix can be obtained in a variety of ways, as, for example, in the form of liquid monomers or prepolymers, which subsequently polymerize into solid polymeric binders, a fluid plastisol comprising a suspension of finely divided solid organic polymer in a high-boiling organic liqud plasticizer, which upon heating dissolves to form a rigid gel, a thermoplastic material, such as asphalt, maintained in liquid state by heating, which solidifies upon cooling, or simply, as in the case of a semi-solid, extrudable monopropellant, a non-volatile organic liquid, which requires no further processing.

In all cases, the organic liquid vehicle must be present in sufficient amount to form a continuous matrix for the dispersed solids and the mixture, after introduction of the solids, must be in a sufficiently soft, plastic state to be castable or extrudable into a grain or mass free from internal voids. Furthermore, the more fluid is the mix after addition of the solids, the more easily can it be processed into solid grains of good, uniform physical properties.

It has, hitherto, been exceedingly difficult and, in many instances, impossible, to obtain the high solids loading desired without exceeding processing limitations and producing grains having unacceptable physical properties.

Oxidizer particle size is an important parameter in loading density. For optimum packing effect and, therefore, high loadings with minimum viscosity, it is essential to employ solid oxidizer fractions of different sizes, the smaller particles being of a size such as to fit within the interstices between the larger particles. For a good packing effect, the size ratio of the largest to the smallest particles should be at least about 5:1 and preferably at least about 10:1. For optimum packing, several stepped size fractions can be used, e.g. a size dispersion of 500 microns; 50 microns; 5 microns.

The composite propellant art has hitherto employed solid oxidizer salts, such as ammonium perchlorate and ammonium nitrate, in their commonly available form. The smallest crystallized, namely unground, material generally obtainable averages about 250 microns in size. The fines present in the commercial material are generally crushed, jagged fragments. For high oxidizer loadings considerably smaller size fractions must be employed either instead of or together with the relatively large, commercially available salt sizes to achieve the packing effect aforedescribed. To obtain the requisite fine particle sizes, it has been the general practice to grind the oxidizer to the desired size. This, of course, produces particles of jagged contours.

Loading of the liquid component with increasing amounts of such oxidizer particles, as is to be expected from the addition of any finely divided solid, increases the viscosity of the mixture. However, a limit of addition in terms of castability or extrudibility, even with optimum distribution of particle size, is frequently reached at a level below that desired for a particular propellent application. This is particularly serious where a finely divided solid fuel, such as powdered metal or carbon, which is insoluble in the organic matrix and which requires at least a portion of the solid oxidizer for combustion, is also an added component. Since the loading capacity of the mix is limited not by the chemical nature of the added solids but by their physical state, the addition of increasing proportions of insoluble solid fuel components must be done at the expense of solid oxidizer. Obviously a limit in reduction of oxidizer concentration will be reached below which performance of the propellant will be seriously impaired. This markedly limits the range of propellent formulation.

The object of this invention is greatly to increase solids loading capacity in the formulation of composite propellent compositions.

Another object is to improve the castability and extrudibility of the liquid-solids mixture by substantially reducing its viscosity, particularly at high loading, thereby minimizing processing difficulties and improving the physical properties of the finished propellent compositions.

Other objects and advantages will become obvious from the following detailed description.

I have discovered that the organic fuel vehicle, which is in liquid state at the point of admixture of the dispersed solids, can be loaded with very substantially larger amounts of solid oxidizer without sacrifice of castability or extrudibility when at least a portion of the inorganic oxidizing salt consists of particles having rounded contours and a maximum particle size of about 100 microns and preferably a maximum size of about 80 microns. Preferably the particles are substantially spheroidal in shape. It will be understood that the term spheroidal as employed in this specification and claim refers to rounded particles which can vary from spherical to substantially oval or ellipsoid shapes and which need not be completely symmetrical. The essential feature is that the particles be substantially free from sharp or jagged edges.

Not only does the use of the small rounded oxidizer salt particles increase oxidizer loading capacity and, thereby, total solids loading capacity, but it very substantially improves the viscosity characteristics of the mix at any solids loading concentration hitherto employed, thus markedly facilitating processing into the finished composite propellant composition or grain. It also makes possible the addition of increased amounts of insoluble solid fuel components without excessive reduction in solid oxidizer concentration. Such insoluble fuel components can include, for example finely divided carbon, silicon, boron, aluminum, magnesium, zirconium, beryllium, and titanium.

Any suitable inorganic oxidizing salt, such as ammonium, sodium, potassium and lithium perchlorate or nitrate, in the form of small particles having rounded contours, as aforedescribed, can be employed with improvement in solids loading properties. The small rounded or spheroidal particles can be made in a variety of ways, as, for example by the spray drying of aqueous solutions of the oxidizer salt, by rapid recrystallization, or by prilling if the material can be melted. By proper manipulation of processing conditions, particle size of the rounded particles can be controlled to a very substantial degree.

The following examples are illustrative of methods for making rounded oxidizer salt particles in the desired small size.

Example 1

A 30% solution of ammonium perchlorate in water was sprayed into a drying chamber at a feed rate of 210 ml./min. Temperature of the solution was 155° F. Temperature of the circulating drying air at inlet was 800° F. and at outlet 450° F. The resulting ammonium perchlorate product consisted of rounded particles having a weight average particle size of 8.6 microns.

A run of a similar solution at a solution feed temperature of 160° F. a feed rate of 435 ml./min. drying air temperature at inlet of 600° F. and temperature at outlet of 310° F. gave a product consisting of rounded particles having a weight-average particle size of 13.9 microns.

Example 2

A 40% aqueous solution of ammonium perchlorate at an initial temperature of 100° C. was cooled at the rate of 10° C./min. by addition of Dry Ice with agitation. The precipitated salt was filtered and dried. The product consisted of rounded crystals having a weight-average size of about 30 microns.

The small rounded oxidizer particles effectively increase loading capacity and reduce viscosity of the propellant mix even when they constitute a relatively small proportion by weight of the total oxidizer, e.g. as little as about 5% or 10%. Excellent results can be obtained with mixtures of oxidizer particles which are substantially larger than 100 microns, as, for example, commercially available grades, and the small rounded particles under 100 microns in size, as well as with an oxidizer consisting completely of rounded particles up to 100 microns in size, so long as the size range of the particles of the total oxidizer is properly distributed.

The small rounded oxidizer salt improves loading capacity and reduces viscosity when introduced into any organic fuel vehicle or binder which is in liquid state. Thus it can be employed with any organic fuel matrix which contains molecularly combined carbon and hydrogen and which, therefore, burns to produce porpulsive gases.

The liquid organic vehicle can be liquid organic monomers or prepolymers which, after incorporation of the solid oxidizer salt, are molded and cured into solid fuel binders. Illustrative of such compositions are the aliphatic polyether polysulfide prepolymers, with or without liquid epoxy cross-linking agents, cured to solid binders with metal peroxides; liquid prepolymers, such as polyglycols, e.g. polypropylene glycol, or polyester polyols reacted with an excess of organic polyisocyanate, e.g. tolylene diisocyanate, which react with additional polyol, such as castor oil, to form solid polyurethanes; liquid butadiene-acrylic acid and -methacrylic acid prepolymers, which are cross-linked with epoxy curing agents; solutions of alkyd polyesters in styrene monomer, which are cured into solid polymers with the aid of peroxide catalysts; and the like.

The liquid vehicle can also be a liquid plastisol, namely a high-boiling, organic liquid plasticizer containing dispersed therein finely-divided, spherical particles of a solid organic polymer, such as polyvinyl chloride, vinyl chloride-vinyl acetate copolymers, cellulose acetate, nitrocellulose and the like, which upon heating dissolve in the plasticizer to form a rigid gel binder. Any of the numerous plasticizers or mixtures of plasticizers which dissolve the dispersed solid polymer very slowly at ordinary and rapidly at elevated temperatures can be employed. Illustrative examples of suitable organic liquid plasticizers include sebacates, such as dibutyl sebacate and dioctyl sebacate; phthalates, such as dibutyl phthalate, dioctyl phthalate, and di-(methoxyethyl) phthalate; adipates, such as dioctyl adipate and di-(3,5,5-trimethylhexyl) adipate; glycol esters of higher fatty acids; and the like.

Such plastisol propellant systems have the important advantage of not requiring chemical or catalytic curing, since the binder rapidly gels into a solid of excellent flexibility and tensile strength merely by heating the mix to the solution temperature of the polymer in the plasticizer. The plastisol systems also can incorporate high concentrations of finely divided insoluble solids and retain sufficient fluidity to permit their introduction into a mold and solution curing without the application of consolidating pressure.

The small particles of solid polymer, which are dispersed at ordinary temperatures in the liquid plasticizer to form the fluid plastisol slurry, comprise an additional solid phase component, which to some extent reduces the quantity of other finely divided insoluble solids, such as the inorganic oxidizer and solid fuel that can be incorporated without destroying cast-ability, namely increasing viscosity to the point where substantial pressure must be applied to consolidate the mix and to make it conform to the shape of the mold. The rounded inorganic oxidizer salts are particularly advantageous in plastisol mixes since they vary substantially increase solids loading capacity without impairing the fluid castability, which is one of the important advantages of such systems.

The small rounded oxidizer salts can also be used advantageously to increase the loading capacity of composite thermoplastic organic fuel binder systems in which the binder is heated to the liquid state to permit incorporation of the oxidizer. Such binders include, for example, asphalt, asphalt plasticized with hydrocarbon oils, and plasticized thermoplastic synthetic polymers, e.g. ethyl cellulose plasticized with castor oil. After admixture of the solid oxidizer salt, the hot mix is introduced into a mold, where it solidifies upon cooling.

Another important application of the invention is in semi-solid, composite monopropellant systems. Such compositions are thixotropic, cohesive, shape-retentive compositions which can be extruded under moderate pressures into the combustion chamber of a rocket or other gas-generating device, where they form continuously advancing columns which burn on the exposed surface. Such plastic monopropellent compositions generally comprise a stable dispersion of a finely divided, insoluble solid oxidizer with or without a finely divided insoluble solid fuel, such as a powdered metal, in a continuous matrix of any suitable oxidizable, high-boiling organic liquid fuel containing molecularly combined carbon and hydrogen. Illustrative of suitable liquid fuels are hydrocarbons, such as triethyl benzene, liquid polyisobutylene, and the like; compounds containing oxygen linked to a carbon atom, as, for example esters, like dimethyl maleate, dibutyl oxalate, and dibutyl phthalate; alcohol, such as benzyl alcohol and triethylene glycol; ethers, such as methyl β-naphthyl ether; and many others.

Such plastic monopropellants merely require thorough blending of the components. No curing is necessary as in the case of solid propellent compositions. The physical properties of the plastic monopropellant are, however, of great importance for the particular mode of use, in terms, for example, of extrusion ease, cohesiveness, tensile strength, absence of voids, and the like. The addition of finely divided insoluble solid components in such large amounts as adversely to affect the requisite physical properties cannot be tolerated. The small rounded oxidizer salts are highly advantageous in such semi-solid systems since they both improve the physical properties of the composition and increase loading capacity.

The foregoing description has dealt mainly with inert organic fuel matrices which require an external source of oxygen, namely the solid inorganic oxidizing salt, for combustion. Such compositions obviously require high concentrations of the oxidizer salt. The small rounded oxidizer salt can, however, be employed very advantageously in composite propellants which comprise an active organic fuel matrix (namely a compound or compounds which contain molecularly combined oxygen available for combustion of other components of the molecule, such as carbon and hydrogen), and a dispersed insoluble solid fuel, such as a powdered metal, or a dissolved inert component, such as an organic plasticizer, to reduce sensitivity of the composition. Examples of active components which can be employed in such propellent systems are compounds containing nitroso, nitro, nitrite, and nitrate radicals, such as cellulose nitrate and nitroglycerine.

For efficient performance, an inorganic oxidizer salt must be incorporated to provide for combustion of the inert fuel component. The use of the rounded oxidizer salt very considerably improves the physical and processing characteristics, particularly when the added inert fuel component is in the form of a finely divided insoluble solid, in the case both of a mix which is subsequently cast and cured into a solid grain and of a mix which is maintained in semi-solid state and burned, as aforedescribed, in the form of extruding advancing columns.

Examples of highly effective composite propellents containing active organic fuel components, include a composition comprising a solid oxidizer salt, such as ammonium perchlorate, and a powdered metal fuel, such as aluminum, dispersed in a solid matrix comprising nitrocellulose plasticized with nitroglycerine; a similar composition in which at least a part of the nitroglycerine is replaced by an inert organic liquid plasticizer, such as triacetin; and a semi-solid monopropellant comprising inorganic oxidizer salt and a powdered metal fuel dispersed in an organic liquid, at least a portion of which is active, such as nitroglycerine.

The following specific examples illustrate the advantageous effect of the small rounded inorganic oxidizer salts of the invention.

Example 3

The following propellant compositions were prepared:

(A)

| Ammonium perchlorate: | Parts by weight |
|---|---|
| Commercial, unground, 246–295 microns | 27.01 |
| Ground, 6900 r.p.m. 2TH, jagged, approximately 30 microns weight-average size | 54.02 |
| Polyvinyl chloride-finely divided | 8.44 |
| Dibutyl sebacate | 10.23 |
| Carbon black | 0.05 |
| Wetting agent | 0.25 |

(B)

| Ammonium perchlorate: | |
|---|---|
| Commercial, unground, >420 microns | 52.30 |
| Recrystallized, spheroidal, 20–50 microns | 30.99 |
| Spray dried, spheroidal, 2–15 microns | 2.42 |
| Polyvinyl chloride—finely divided | 5.59 |
| Dibutyl sebacate | 8.46 |
| Wetting agent | 0.24 |

(C)

| Ammonium perchlorate: | |
|---|---|
| Commercial, unground, >420 microns | 47.40 |
| Recrystallized, spheroidal, 20–50 microns | 24.80 |
| Spray dried, spheroidal, 2–15 microns | 15.80 |
| Polyvinyl chloride | 4.59 |
| Dibutyl sebacate | 7.16 |
| Wetting agent | 0.25 |

The three compositions were processed by the plastisol technique. All of the components were thoroughly blended at ordinary temperature. At such temperatures, the polyvinyl chloride remains dispersed as a finely divided solid in the liquid dibutyl sebacate plasticizer.

The viscosity of mix A containing 81% insoluble oxidizer and 89.5% total solids including the PVC, as measured by Brookfield Helipath viscosimeter, TE Spindle, at 4 r.p.m. and 30° C., was 398,000 cp. The viscosity of mix B containing 85.7% of the insoluble oxidizer and 91.3% total solids, measured in the same way, was only 246,000 cp. Mix C containing 88% of the insoluble oxidizer and 92.8% total solids was a castable mix having a viscosity of 430,000 cp. It should be noted that extensive experience has shown that mix A cannot be further increased in oxidizer content by addition of more of the large commercial fraction of the small, ground, angular ammonium perchlorate without making it virtually uncastable by the fluid plastisol technique.

Example 4

The following propellent compositions were prepared:

(A)

| Ammonium perchlorate: | Weight Percent |
|---|---|
| 1 part commercial unground, 246–295 microns; 2 parts ground, jagged, 30 microns weight-average size | 58.90 |
| Al powder | 21.10 |
| Polyvinyl chloride | 8.6 |
| Dioctyl adipate | 10.79 |
| Stabilizer | 0.34 |
| Wetting agent | 0.25 |

(B)

| Ammonium perchlorate: | |
|---|---|
| Commercial, unground, 246–295 microns | 47.90 |
| Recrystallized, spheroidal, 37–53 microns | 10.80 |
| Powdered Al | 30.30 |
| Dibutyl sebacate | 6.95 |
| Polyvinyl chloride | 3.80 |
| Wetting agent | 0.25 |

(C)

| Ammonium perchlorate: | |
|---|---|
| Commercial, unground, 246–295 microns | 47.40 |
| Recrystallized, spheroidal, 37–53 microns | 10.60 |
| Al Powder | 30.00 |
| Dibutyl sebacate | 6.95 |
| Polyvinyl chloride | 4.80 |
| Wetting agent | 0.25 |

The compositions were mixed at room temperature according to the plastisol technique and the viscosity of the mixes measured by Brookfield Helipath, TE Spindle, at 4 r.p.m. and 30° C. with the following results:

| Mix: | Cp. |
|---|---|
| A (insoluble solids 80%; total solids 88.6%) | 355,000 |
| B (insoluble solids 89%; total solids 92.8%) | 286,000 |
| C (insoluble solids 88%; total solids 92.8%) | 155,400 |

Although only a minor proportion of the total oxidizer consisted of the small rounded perchlorate, insoluble solids loading was greatly increased as well as total solids loading as compared with Mix A, with a concomitant decrease in mix viscosity and improved castability.

Example 5

An internal burning propellent grain 5 inches in diameter weighing 10.5 lbs. was made by the plastisol technique from the following composition:

Ammonium perchlorate:
  Commercial, unground, 246–295 microns ___ 38.7
  Recrystallized, spheroidal, 37–53 microns ___ 19.3
Al powder _____ 30.00
Dibutyl sebacate _____ 6.95
Polyvinyl chloride _____ 4.80
Wetting agent _____ 0.25

The composition was blended at room temperature into a castable mix which was poured into a mold and heated to the solution temperature of the PVC in the dibutyl sebacate to form the solid grain.

The grain was inserted into a rocket motor successfully at an ambient temperature of 70° F. The grain burned for 2.32 seconds at a rate of 0.346 in./sec. at an average web pressure of 876 p.s.i.a.

Although this invention has been described with reference to illustrative embodiments thereof, it will be apparent to those skilled in the art that it can be embodied in other forms within the scope of the appended claims.

I claim:

1. In composite propellent compositions comprising an insoluble solid inorganic oxidizer salt dispersed in an organic fuel matrix, the improvement in which at least about 5% by weight of the total oxidizer salt consists essentially of particles having rounded contours and a maximum size of about 100 microns.

2. The propellent composition of claim 1 in which the rounded oxidizer salt particles comprise at least about 10% by weight of total oxidizer salt.

3. The propellent composition of claim 2 which contains in addition a finely divided insoluble solid fuel.

4. The propellent composition of claim 3 in which the finely divided insoluble solid fuel is a metal powder.

5. The propellent composition of claim 2 in which the oxidizer salt is ammonium perchlorate.

6. The propellent composition of claim 4 in which the oxidizer salt is ammonium perchlorate.

7. The propellent composition of claim 6 in which the organic fuel matrix is plasticized polyvinyl chloride.

8. The propellent composition of claim 6 in which the organic fuel matrix is a polyurethane.

9. In a process for making composite propellent compositions comprising dispersing an insoluble solid inorganic oxidizing salt in a continuous organic fuel matrix in liquid state, the improvement in which at least about 5% by weight of the total added oxidizer salt consists essentially of particles having rounded contours and a maximum size of about 100 microns.

10. The process of claim 9 in which the rounded oxidizer salt particles having a maximum size of about 100 microns comprise at least about 10% by weight of total oxidizer salt.

11. The process of claim 10 in which a finely divided insoluble solid fuel is added together with said oxidizer salt to said liquid organic fuel component.

12. The process of claim 11 in which the insoluble solid fuel is a metal powder.

13. The process of claim 10 in which the oxidizer salt is ammonium perchlorate.

14. The process of claim 12 in which the oxidizer salt is ammonium perchlorate.

15. The composition of claim 1 in which the total oxidizer salt consists of particles of different sizes, the ratio of largest to smallest oxidizer particle size being at least about 5:1.

16. The composition of claim 2 in which the total oxidizer salt consists of particles of different sizes, and the ratio of largest to smallest oxidizer particle size is at least about 10:1.

17. The process of claim 9 in which the total oxidizer salt consists of particles of different sizes, the ratio of largest to smallest oxidizer particle size being at least about 5:1.

18. The process of claim 10 in which the total oxidizer salt consists of particles of different sizes, and the ratio of largest to smallest particle size is at least about 10:1.

19. In a process for making a composite solid propellant which comprises admixing an insoluble solid, inorganic oxidizer salt and a solid, organic polymer in the form of small spherical particles selected from the group consisting of polyvinyl chloride, vinyl chloride—vinyl acetate copolymer, cellulose acetate, and nitrocellulose, with a high-boiling, liquid organic plasticizer which dissolves said polymer readily only at elevated temperatures to form a fluid slurry, and then heating said mixture to the temperature at which said polymer dissolves in said liquid plasticizer to form a solid gel, the improvement in which at least 10% by weight of the oxidizer salt consists essentially of rounded particles having a maximum size of about 100 microns.

20. The process of claim 19 in which a finely divided metal fuel is admixed with said liquid plasticizer together with said oxidizer salt and said organic polymer.

References Cited

UNITED STATES PATENTS

| | | | |
|---|---|---|---|
| 2,929,697 | 3/1960 | Perry et al. | 149—19 |
| 2,941,878 | 6/1960 | Mahan et al. | 149—19 |
| 2,622,277 | 12/1952 | Bonell et al. | 264—3 |
| 3,106,497 | 10/1963 | Weil. | |

OTHER REFERENCES

Warren, "Rocket Propellants" Reinhold Publishing Corp., N.Y. (1958), pp. 58 to 67, especially p. 61.

BENJAMIN R. PADGETT, *Primary Examiner.*

U.S. Cl. X.R.

149—18, 20, 21, 112, 113